Patented May 7, 1946

2,399,946

UNITED STATES PATENT OFFICE 2,399,946

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application February 17, 1944, Serial No. 522,787

4 Claims. (Cl. 260—28)

My invention relates to improvements in the compounding and vulcanization of synthetic rubbers produced by copolymerization of butadiene and styrene. Synthetic rubbers of this type are illustrated by the copolymer product currently designated GR-S rubber. In my application, Serial No. 522,785, filed February 17, 1944, I have described my discovery that the addition of 0.005–1%, more suitably 0.01–0.5%, of copper (as such or in the form of an appropriate compound) to compounds of this type of synthetic rubber affords important improvements with respect to rate of cure and variability, particularly in rate of cure, when these compounds are vulcanized with sulfur, as such, in amount exceeding that required to form cupric sulfide with the copper present. I have found that copper is with advantage added to compounds of such synthetic rubber, in applying my discovery, as a mixture of a bitumen and an oil soluble copper soap such as copper oleate or copper stearate or copper resinate. Dispersion of the copper in the synthetic rubber compound is thus facilitated while particles of metallic copper are eliminated from the compound. The bitumen may be one of those conventionally used as a plasticizer or extender of such synthetic rubber compounds and may thus be made to serve a double function in the compounding and vulcanization of the synthetic rubber. In this aspect the mixture of bitumen and oil soluble copper soap itself constitutes a new and valuable compounding material.

The following examples will illustrate practices embodying my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in each group being effected at the same temperature, and, for each period of cure, the values for stress at 200% elongation in pounds per square inch appear under "S," for tensile strength in pounds per square inch under "T," for percentage elongation at break under "E," and for Shore hardness under "H."

|  | Example I | Example II |
|---|---|---|
| GR-S rubber | 100 | 100 |
| Zinc oxide | 5 | 5 |
| Channel carbon black | 50 | 50 |
| Clay | 150 | 150 |
| Benzothiazyldisulfide | 1.5 | 1.5 |
| Zinc diethyldithiocarbamate | .15 | .15 |
| Sulfur | 3.25 | 3.25 |
| Bitumen | 25 |  |
| Modified bitumen |  | 25 |

| 320° F. | S | T | E | H | S | T | E | H |
|---|---|---|---|---|---|---|---|---|
| 3 min | Uncured |  |  |  | 545 | 745 | 360 | 71 |
| 5 min | Uncured |  |  |  | 825 | 1100 | 400 | 75 |
| 8 min | Uncured |  |  |  | 940 | 1290 | 375 | 78 |
| 12 min | 625 | 725 | 340 | 70 | 1070 | 1445 | 345 | 82 |
| 15 min | 725 | 1000 | 360 | 74 | 1150 | 1450 | 325 | 82 |

The foregoing Examples I and II illustrate the application of my invention to a heel stock compounded with clay.

|  | Example III | Example IV | Example V |
|---|---|---|---|
| GR-S rubber | 100 | 100 | 100 |
| Zinc oxide | 5 | 5 | 5 |
| Channel carbon black | 50 | 50 | 50 |
| Thermal carbon black | 100 | 100 | 100 |
| Benzothiazyldisulfide | 1.5 | 1.5 | 1.5 |
| Zinc diethyldithiocarbamate | .15 | .15 | .15 |
| Sulfur | 3.25 | 3.25 | 3.25 |
| Bitumen | 25 |  | 25 |
| Modified bitumen |  | 25 |  |
| Copper powder (through 300 mesh) |  |  | .10 |

| 320° F. | S | T | E | H | S | T | E | H | S | T | E | H |
|---|---|---|---|---|---|---|---|---|---|---|---|---|
| 3 min | Uncured |  |  |  | 440 | 1175 | 640 | 63 | 470 | 1110 | 640 | 61 |
| 5 min | 450 | 840 | 720 | 57 | 910 | 1355 | 535 | 69 | 670 | 1270 | 520 | 65 |
| 8 min | 490 | 1200 | 630 | 62 | 1130 | 1400 | 325 | 72 | 930 | 1290 | 375 | 68 |
| 12 min | 785 | 1300 | 495 | 65 | 1240 | 1360 | 300 | 74 | 1045 | 1400 | 395 | 70 |
| 15 min | 845 | 1150 | 360 | 67 | 1305 | 1430 | 310 | 75 | 1210 | 1350 | 320 | 72 |

The foregoing Examples III, IV and V illustrate the application of my invention to a heel stock compounded with carbon black.

The bitumen used in the foregoing examples was produced by reducing a cycle stock derived from cracked crude petroleum. It had a Furol viscosity at 210° F. of about 215 seconds, a bromine number of about 35 and a specific gravity at 60° F. of about 1.09. The modified bitumen used in the foregoing examples was a mixture of the bitumen just described with copper oleate added in proportion such that the modified bitumen contained about 0.4% by weight on the bitumen of copper measured as copper.

Comparing Example II with Example I, and again comparing Example IV with Example III, the acceleration of the rate of cure will be apparent. The savings in time required for vulcanization of products from such stocks shown by these comparisons are an important economy, particularly in the production of products of relatively thick section. These same comparisons also show, in addition to this saving of time, substantial improvement in the physical properties of the vulcanizates.

It will also be noted, comparing Example IV to Example V, that the mixture of bitumen and copper soap produces physical properties somewhat superior to those produced by the separate use of the bitumen and the equivalent amount of metallic copper. The parts by weight on the GR-S rubber of added copper, measured as copper, is the same in Example IV and Example V. In addition to the minor superiorities indicated by this comparison, the elimination of particles of metallic copper also eliminates focal points for rupture of the vulcanized compound, an advantage with respect to flexing for example. The use of equivalent amounts of copper soap, in the bitumen, however, produces the new results of copper addition described in my concurrently filed application previously identified.

The proportion of sulfur used is not critical and may follow conventional practices providing it is added to the compound subjected to vulcanization in amount exceeding that required to combine with the added copper to form cupric sulfide.

My invention includes the vulcanizable but unvulcanized copolymer of butadiene and styrene containing sulfur and a mixture of a bitumen and an oil soluble copper soap and the product of vulcanization of such copolymer compounds.

My invention also includes, as a new compounding material, mixtures of bitumen and oil soluble copper soaps.

I claim:

1. A vulcanizable compound comprising a rubbery copolymer of butadiene and styrene, a mixture of bitumen and an oil soluble copper soap, and an amount of sulfur exceeding the amount required to convert all of the copper to cupric sulfide, the bitumen being capable of and being present in a quantity facilitating dispersion of the copper soap in the copolymer, the total copper content of the compound being not less than about 0.005% nor more than about 1% on the weight of the copolymer.

2. The product of vulcanization of a compound comprising a rubbery copolymer of butadiene and styrene, a mixture of bitumen and an oil soluble copper soap, and an amount of sulfur exceeding the amount required to convert all of the copper to cupric sulfide, the bitumen being capable of and being present in a quantity facilitating dispersion of the copper soap in the copolymer, the total copper content of the compound being not less than about 0.005% nor more than about 1% on the weight of the copolymer.

3. A vulcanizable compound comprising a rubbery copolymer of butadiene and styrene, a mixture of bitumen and copper oleate, and an amount of sulfur exceeding the amount required to convert all of the copper to cupric sulfide, the bitumen being capable of and being present in a quantity facilitating dispersion of the copper oleate in the copolymer, the total copper content of the compound being not less than about 0.01% nor more than about 0.5% on the weight of the copolymer.

4. The product of vulcanization of a compound comprising a rubbery copolymer of butadiene and styrene, a mixture of bitumen and copper oleate, and an amount of sulfur exceeding the amount required to convert all of the cupper to cupric sulfide, the bitumen being capable of and being present in a quantity facilitating dispersion of the copper oleate in the copolymer, the total copper content of the compound being not less than about 0.01% nor more than about 0.5% on the weight of the copolymer.

ALBERT A. SOMERVILLE.